United States Patent [19]
D'Alfonso et al.

[11] Patent Number: 5,428,386
[45] Date of Patent: Jun. 27, 1995

[54] REMOTE 3D VIDEO CAMERA SYSTEM

[75] Inventors: David A. D'Alfonso, Goleta; Jordan C. Christoff, Santa Barbara, both of Calif.

[73] Assignee: Envision Medical Corporation, Goleta, Calif.

[21] Appl. No.: 934,815

[22] Filed: Aug. 24, 1992

[51] Int. Cl.6 .......................................... H04N 13/02
[52] U.S. Cl. ..................................... 348/45; 348/47; 348/264; 348/512
[58] Field of Search .............. 358/88, 98, 50, 149; H04N 13/02; 348/45, 47, 264, 512

[56] References Cited

U.S. PATENT DOCUMENTS

| | | | |
|---|---|---|---|
| 4,583,117 | 4/1986 | Lipton et al. | 358/92 |
| 4,809,061 | 2/1989 | Suzuki | 358/50 |
| 4,860,101 | 8/1989 | Pshtissky | 358/149 |
| 4,873,572 | 10/1989 | Miyazaki | 358/88 |
| 4,926,257 | 5/1990 | Miyazaki | 358/88 |
| 5,063,441 | 11/1991 | Lipton et al. | 358/88 |
| 5,175,616 | 12/1992 | Milgram | 358/88 |

*Primary Examiner*—Howard W. Britton
*Attorney, Agent, or Firm*—Lyon & Lyon

[57] ABSTRACT

A remote endoscopic video camera system is provided which is capable of providing both left and right eye pre-video signals for generating a three-dimensional image. The left and right eye pre-video signals are provided by first and second imagers which are capable of being enclosed in a single camera head, which, in turn, is capable of being coupled to the remaining camera circuitry through a single cable, without causing substantial interference between the two imagers.

25 Claims, 9 Drawing Sheets

REMOTE 3D VIDEO CAMERA SYSTEM

BACKGROUND OF THE INVENTION

1. Field of the Invention

This invention relates generally to a video camera and, more specifically, to a remote endoscopic video camera for use in generating a 3D image.

2. Background of the Invention

In an ordinary endoscopic video camera, a small imager, typically a CCD, is attached to the eyepiece of an endoscope, and a flexible cable, typically 10 feet in length, connects the imager to the remaining camera electronics. For medical applications, the resulting imager/endoscope combination is very lightweight, and easier for a surgeon to insert into body cavities for observation of features of internal body structures without the necessity of surgery.

Conventional endoscopic video cameras are presently only capable of generating two-dimensional images. Although the generation of three-dimensional ("3D") images from such cameras is theoretically possible by situating two imagers at the endoscope, with one forming an image for the left eye, and the other, for forming an image at the right eye, the development of such a camera has heretofore not been possible because of at least the following difficulties: (1) the loss of flexibility resulting from the use of two sets of cables and connectors between the camera head containing the two imagers and the rest of the camera circuitry; (2) the difficulty of cleaning and disinfecting the large and complicated camera head resulting from combining two imagers with their own separate housings; and (3) the interference that develops between the pre-video outputs of the imagers when the same are placed in a single housing, or when the signal lines coupling the same to the remaining camera electronics are placed in a single cable.

Consequently, it is an object of the subject invention to provide a remote endoscopic 3D video camera which overcomes the aforementioned difficulties.

SUMMARY OF THE INVENTION

In accordance with the purpose of the invention as broadly described herein, there is provided a video camera system comprising: circuitry including at least one timing driver for generating at least one driving signal; and a camera head including a first imager coupled to the at least one timing driver for generating a first pre-video signal responsive to the at least one driving signal, and a second imager coupled to the at least one timing driver for generating a second pre-video signal responsive to the at least one driving signal; wherein at least a portion of the circuitry is spaced from the camera head, and the circuitry and imagers are configured so that the first and second pre-video signals are substantially synchronous with each other.

In one embodiment, first and second timing drivers in the camera head are provided, one for each imager, and both are controlled by at least one timing signal generated by a single timing generator spaced from the camera head. Consequently, the pre-video output signals from the imagers will not only be substantially synchronous with each other, but also with the at least one timing signal. In a second embodiment, a single timing driver is provided for both imagers, which is controlled by at least one timing signal generated by a timing generator spaced from the camera head. In this embodiment, as well, the pre-video output signals from the imagers will be substantially synchronous with each other and with the at least one timing signal. Thus, the problem of signal interference which results from placing the two imagers within a single enclosure, or by passing the timing and pre-video signals through the same cable and connector is reduced or eliminated. Related methods are also provided.

DESCRIPTION OF THE PREFERRED EMBODIMENTS

Figure 1:
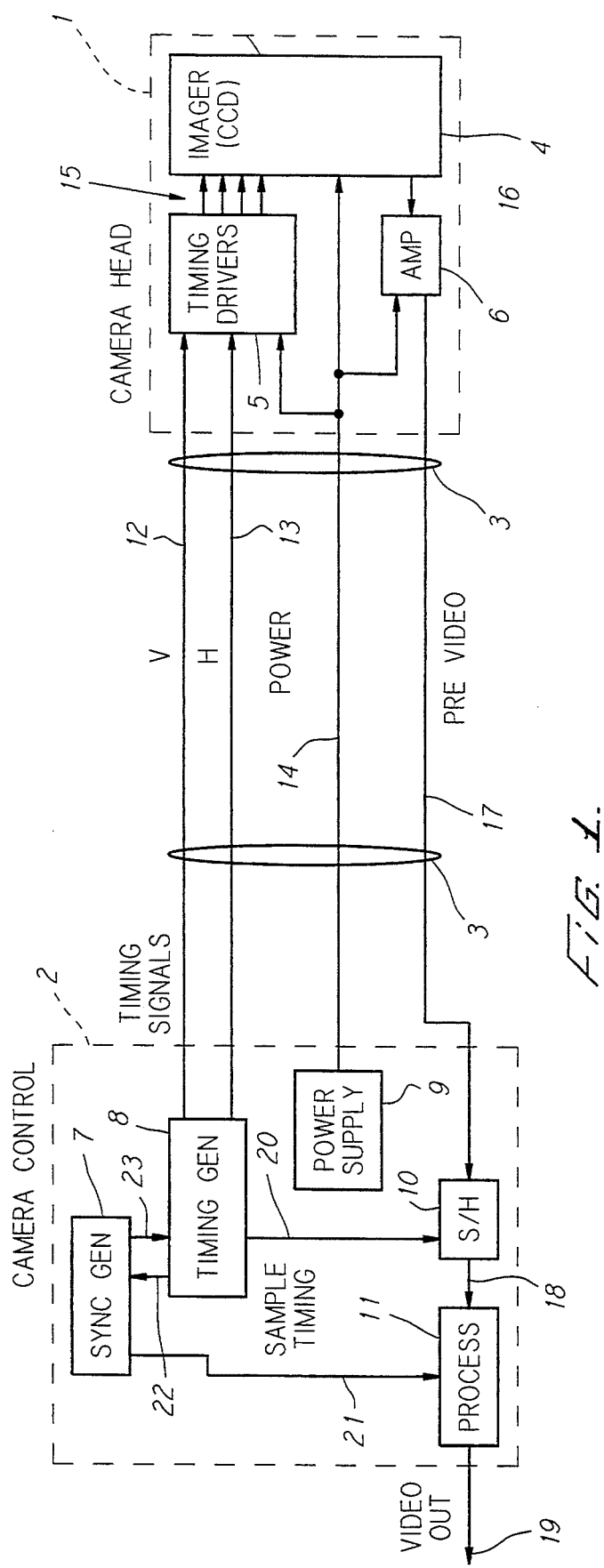
FIG. 1 illustrates a conventional remote video camera system.

A conventional remote endoscopic video camera system is illustrated in FIG. 1. As shown, the system comprises camera head 1 coupled to camera circuitry 2 through cable 3. The camera head, in turn, comprises imager 4, which could be a CCD or the like, timing driver 5, and amplifier 6, coupled together as shown. The camera circuitry 2 comprises control circuitry (which in turn comprises sync generator 7 and timing generator 8); power supply 9; and video processing circuitry (which in turn comprises sample-and-hold circuitry 10 and process circuitry 11).

In this system, the timing generator generates a clock signal, and passes the same to sync generator 7 over signal line 22, which returns a timing signal over signal line 23. Responsive to the timing signal, the timing generator generates V and H timing signals, and passes the same over signal lines 12 and 13, through the cable to the timing driver. (Alternatively, the timing generator generates the V and H timing signals directly without the use of a separate sync generator.) In addition, power is supplied to the camera head over one or more signal lines 14. The power signal sent over the one or more lines 14 is used to power both the timing drivers, the CCD, and the amplifier. The timing driver generates at least one CCD driving signal responsive to the V and H timing signals, and passes the same over one or more signal lines 15 to the CCD. (Alternatively, the timing driver could be situated within the camera circuitry 2, in which case, the at least one driving signal would be generated there, and passed to the CCD via the cable.)

The CCD, responsive to the at least one driving signal, generates a pre-video signal containing image information, and passes the same to current amplifier 6 over signal line 16, which amplifies the signal to compensate for the anticipated decay over the cable. (Alternatively, a voltage amplifier could be used.) The amplified pre-video signal is passed over signal line 17 to the sample-and-hold circuitry 10, which typically is a correlated double sampler ("CDS"). This circuitry samples the incoming pre-video signal responsive to a timing signal generated by the timing generator sent over signal line 20 (determined so that the pre-video signal is sampled at the appropriate time to pick out the image information), and generates what typically is a difference signal (representative of the difference between the sampled value and a reference value). The difference signal is passed to process circuitry 11 over signal line 18 for generation of the video signal 19 responsive to a timing signal sent over signal line 21 generated by the sync generator.

Figure 2:
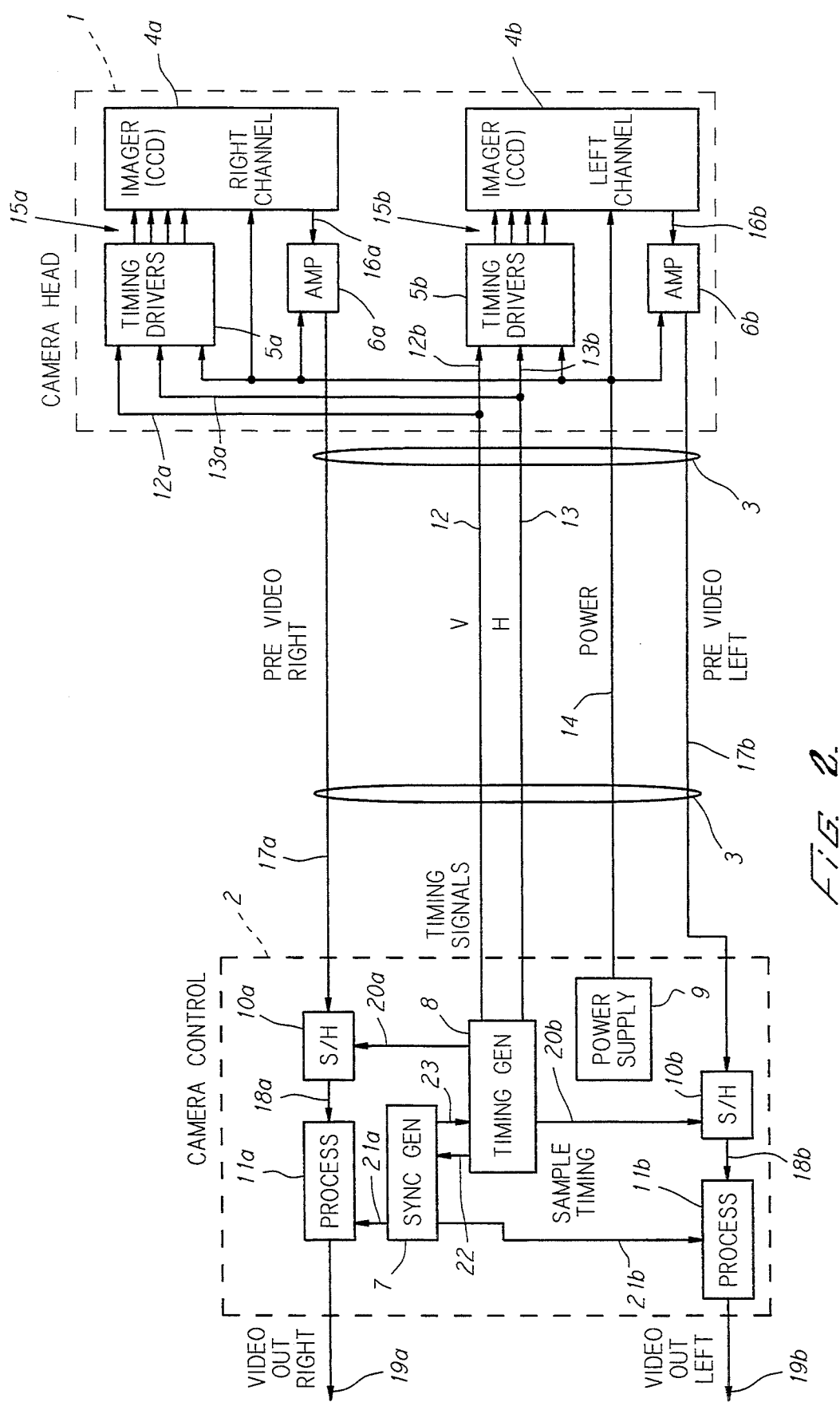
FIG. 2 illustrates an embodiment of a 3D remote video camera system which incorporates the teachings of the subject invention.

FIG. 2 provides an illustration of a first embodiment of the subject invention, in which, compared to FIG. 1, like elements are referenced with like identifying numerals.

In this embodiment, two imagers, 4a and 4b, are provided in the camera head, each with its own corresponding timing driver, respectively identified with numerals 5a and 5b, and current amplifiers, respectively identified with numerals 6a and 6b.

Within the control circuitry, a single timing generator is provided to control both timing drivers by means of the V and H timing signals which are passed to the camera head over signal lines 12 and 13. Within the camera head, the signal lines 12 and 13 are split up into lines 12a and 13a, and 12b and 13b, respectively, to deliver the timing signals to the two timing drivers, 5a and 5b. A single power supply 9 supplies power to both imagers and associated circuitry over one or more signal lines 14.

Each imager generates its own pre-video signal, responsive to first and second driving signals sent over lines 15a and 15b, respectively, generated by the two timing drivers. The two pre-video signals are passed to amplifiers 6a and 6b by means of signal lines 16a and 16b, respectively. After amplification, the pre-video signals are passed through the cable 3 on pre-video right and pre-video left signal lines 17a and 17b, respectively. Consequently, the cable 3 is similar to that in FIG. 1, except that an additional pre-video signal line is provided.

Within the control circuitry, the pre-video right and pre-video left signals are passed to two sample-and-hold circuits, 10a and 10b, which are directed to sample the respective pre-video signals by means of timing signals passed over signal lines 20a and 20b, generated by the sync and timing generators 7 and 8. Two process circuits, 11a and 11b, are provided to which the outputs of the two sample-and-hold circuits are passed over lines 18a and 18b. The two process circuits generate video left and video right signals, 19a and 19b, respectively, which are used to form the 3D image.

In this embodiment, since the two timing drivers and hence imagers are being controlled by the same timing signals, the driving signals generated by the timing drivers and the pre-video output signals will all be substantially synchronous with each other as well as with the incoming timing signals. Thus, the problem of interference between these signals will be substantially avoided, allowing both imagers to be placed in close proximity with each other within the camera head, and a single cable to be used for passing the timing signals to the camera head, and the two pre-video output signals to the control circuitry.

Figure 3:
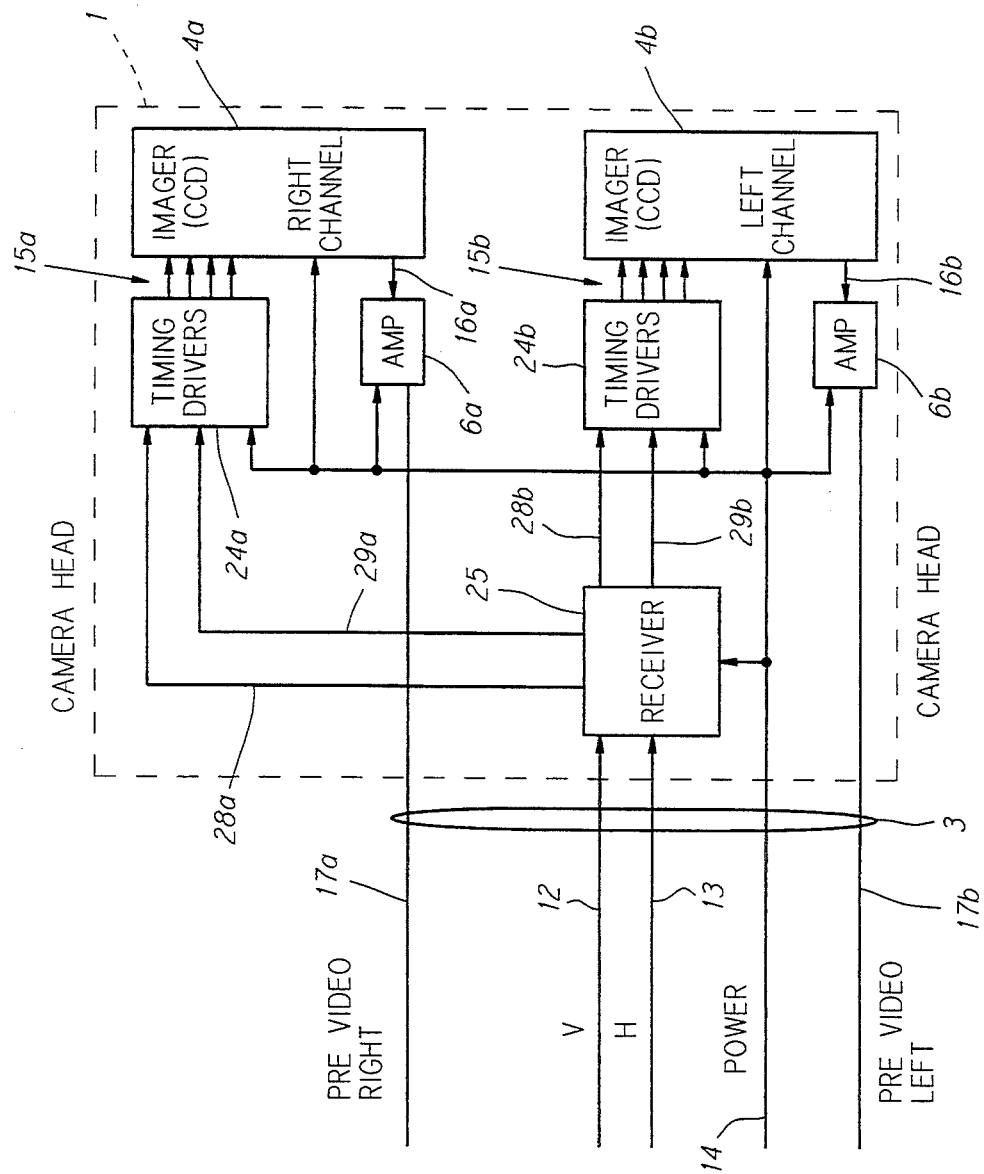
FIGS. 3-5 illustrate alternative embodiments of a 3D remote video camera system incorporating the teachings of the subject invention.

A second embodiment is illustrated in FIG. 3, in which compared to the previous figures, like elements are referenced with like identifying numerals. This embodiment is similar to the first embodiment discussed above, except that a common portion of the two timing drivers, receiver 25 (which may simply be one or more resistors tied to ground), is separated out from both. In this embodiment, the receiver functions to directly receive the V and H timing signals passed to it from the control circuitry, and sends the same, over lines 28a and 29a, and 29a and 29b, respectively, to the remaining portions of the timing drivers, 24a and 24b. Otherwise, the operation is identical to that of the first embodiment.

Figure 4:
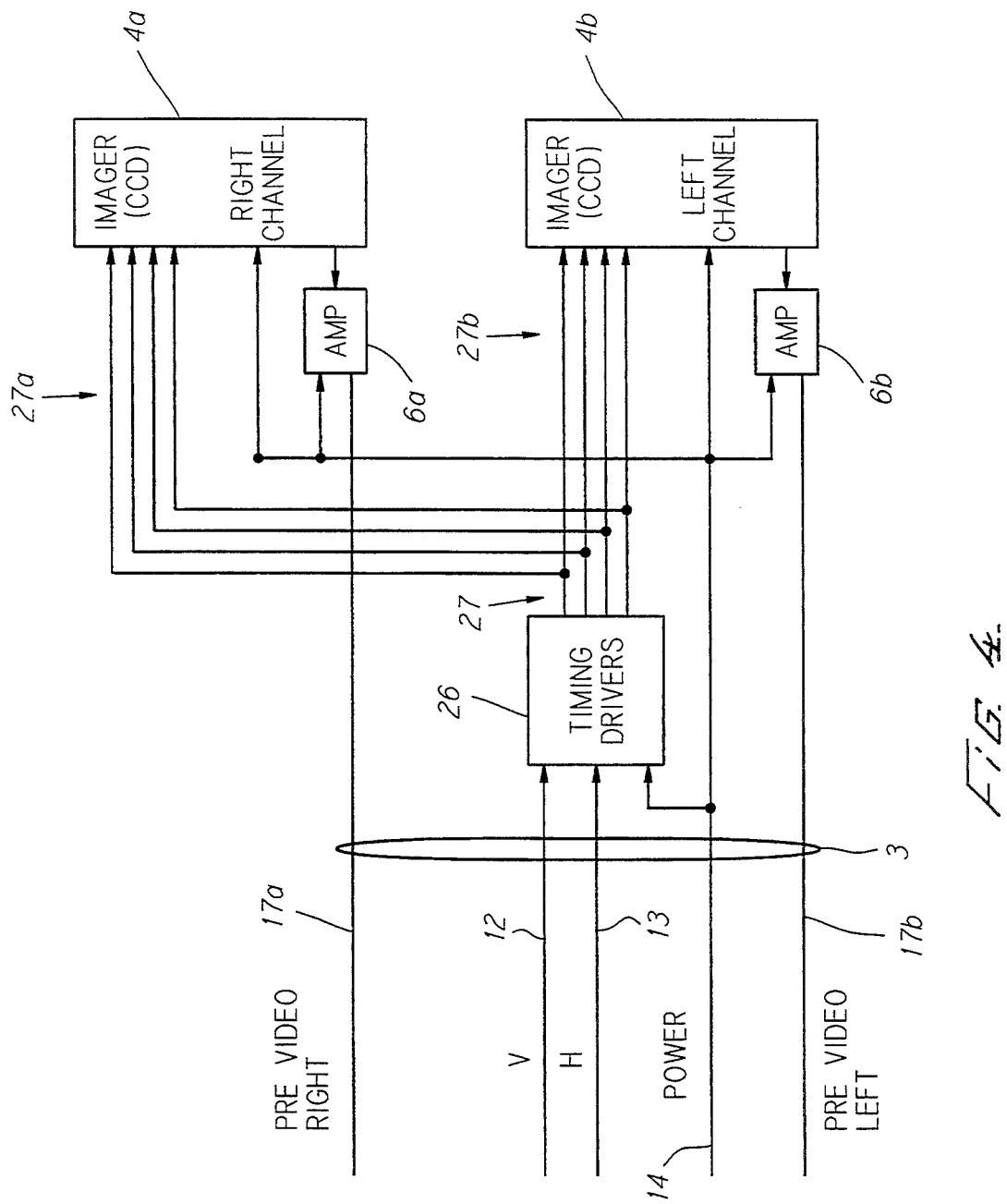

A third embodiment is illustrated in FIG. 4, in which, compared to FIG. 3, like elements are referenced with like identifying numerals. This embodiment is similar to the previous embodiment, except that a single timing driver 26 is provided within the camera head for driving both imagers from the same at least one driving signal. In this embodiment, the at least one driving signal is delivered to the imagers by means of signal lines 27a and 27b, respectively.

Figure 5:
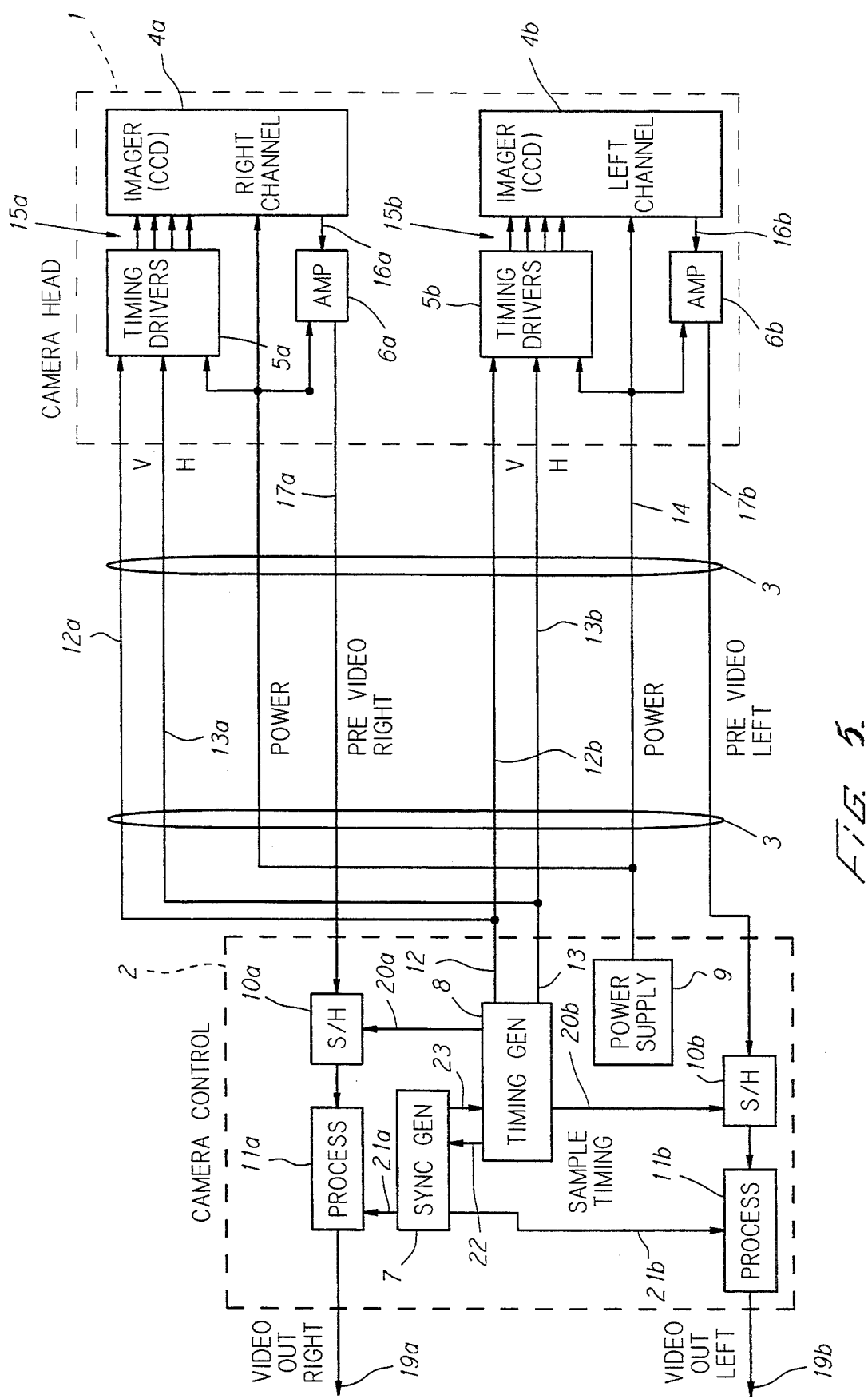

A fourth embodiment is illustrated in FIG. 5, in which compared to the previous figures, like elements are referenced with like numerals. This embodiment is similar to the first embodiment illustrated in FIG. 2, except that the V and H signal lines, 12 and 13, have been split into two sets of signal lines, identified with numerals 12a and 13a, and 12b and 13b, respectively, within the control circuitry, rather than at the camera head as illustrated in FIG. 2. Both sets of lines are capable of being contained within the same cable, with signal lines 12a and 13a being provided to couple the timing driver to timing driver 5a, and signal lines 12b and 13b being provided to couple the timing drivers to timing driver 5b.

It should be appreciated that the second, third, and fourth embodiments are similar to the first in that the pre-video output signals generated by the imagers are substantially synchronous with each other, and with the referenced timing and driving signals, allowing the two imagers to be placed in close proximity with each other within a single enclosure, and the lines carrying the pre-video output signals from both imagers to be enclosed in a single cable.

Figure 6A:
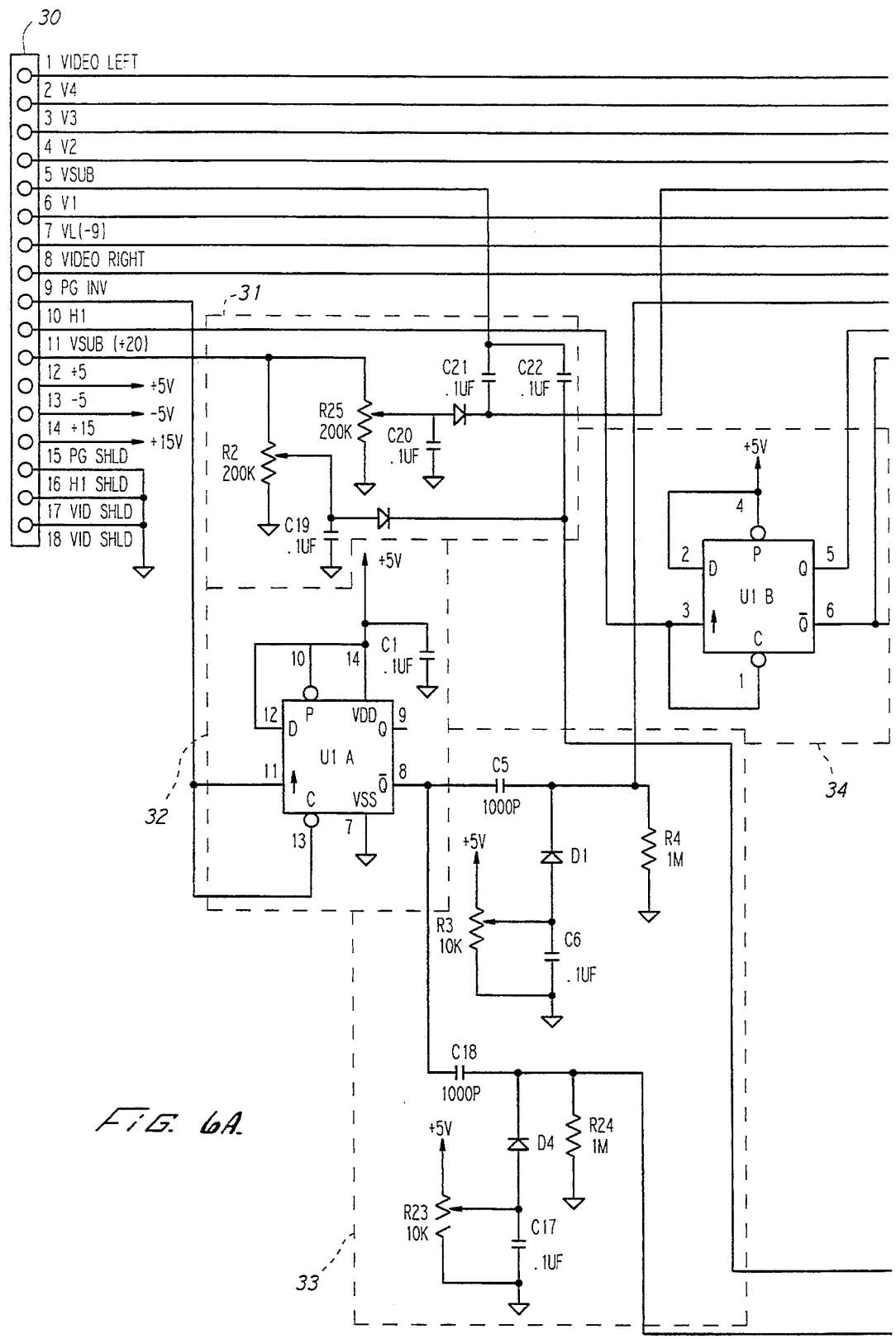
FIG. 6 is a detailed schematic of a 3D remote video camera system which incorporates the teachings of the subject invention.
Figure 6:
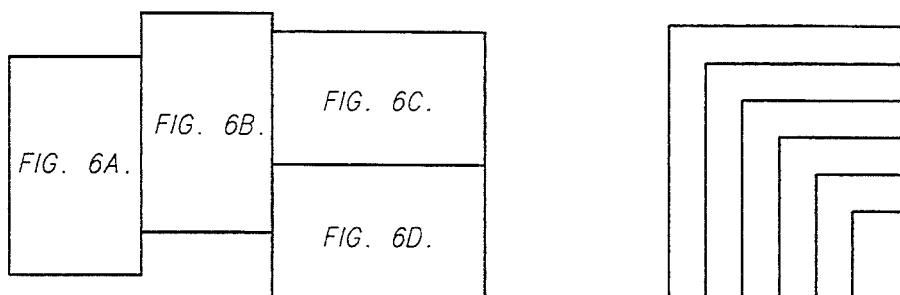
Figure 6B:
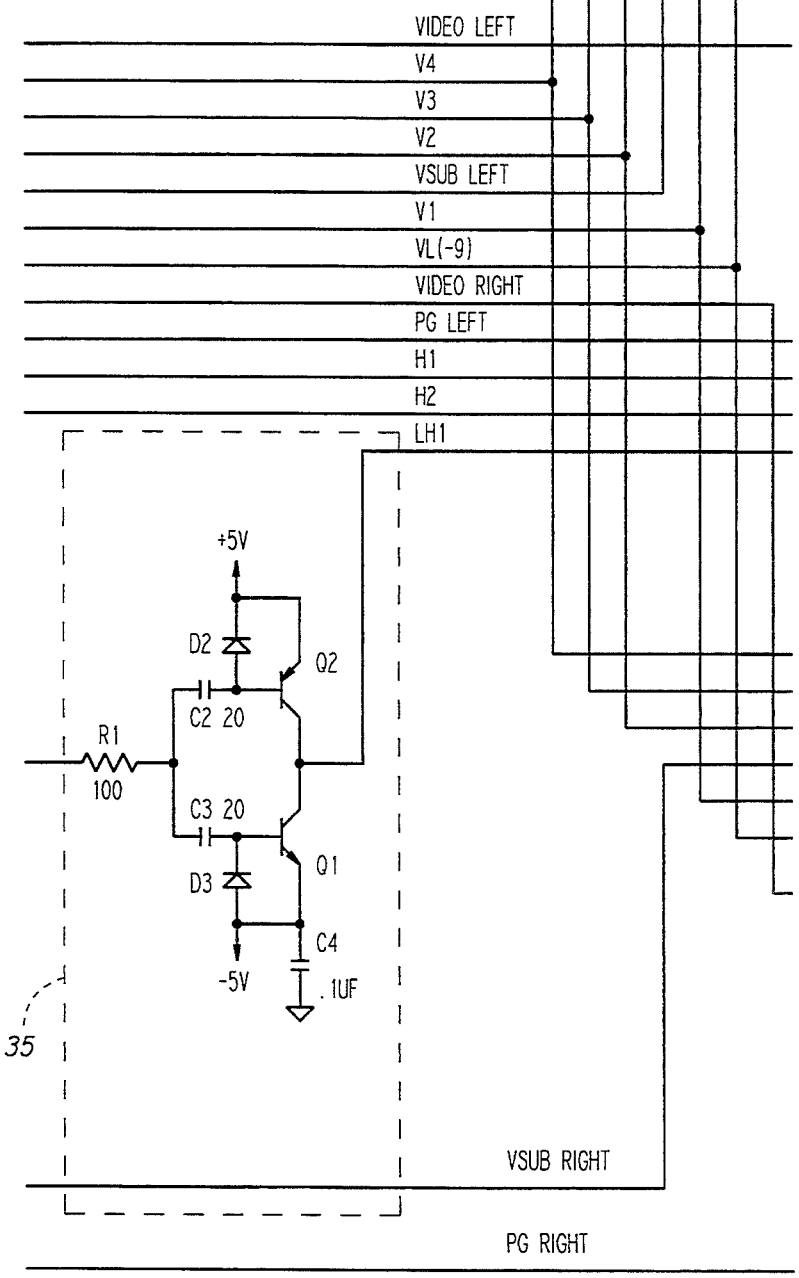
Figure 6C:
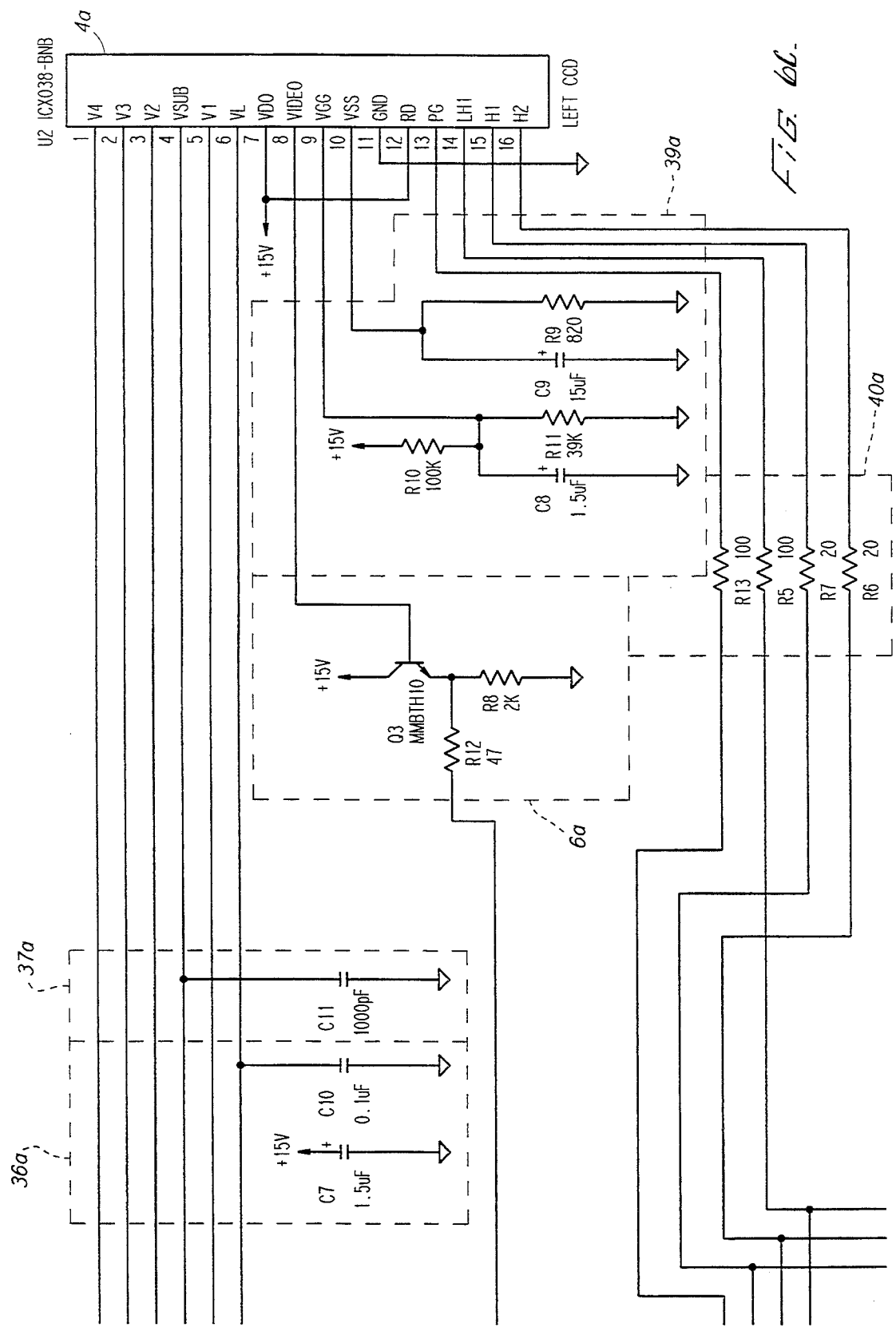
Figure 6D:
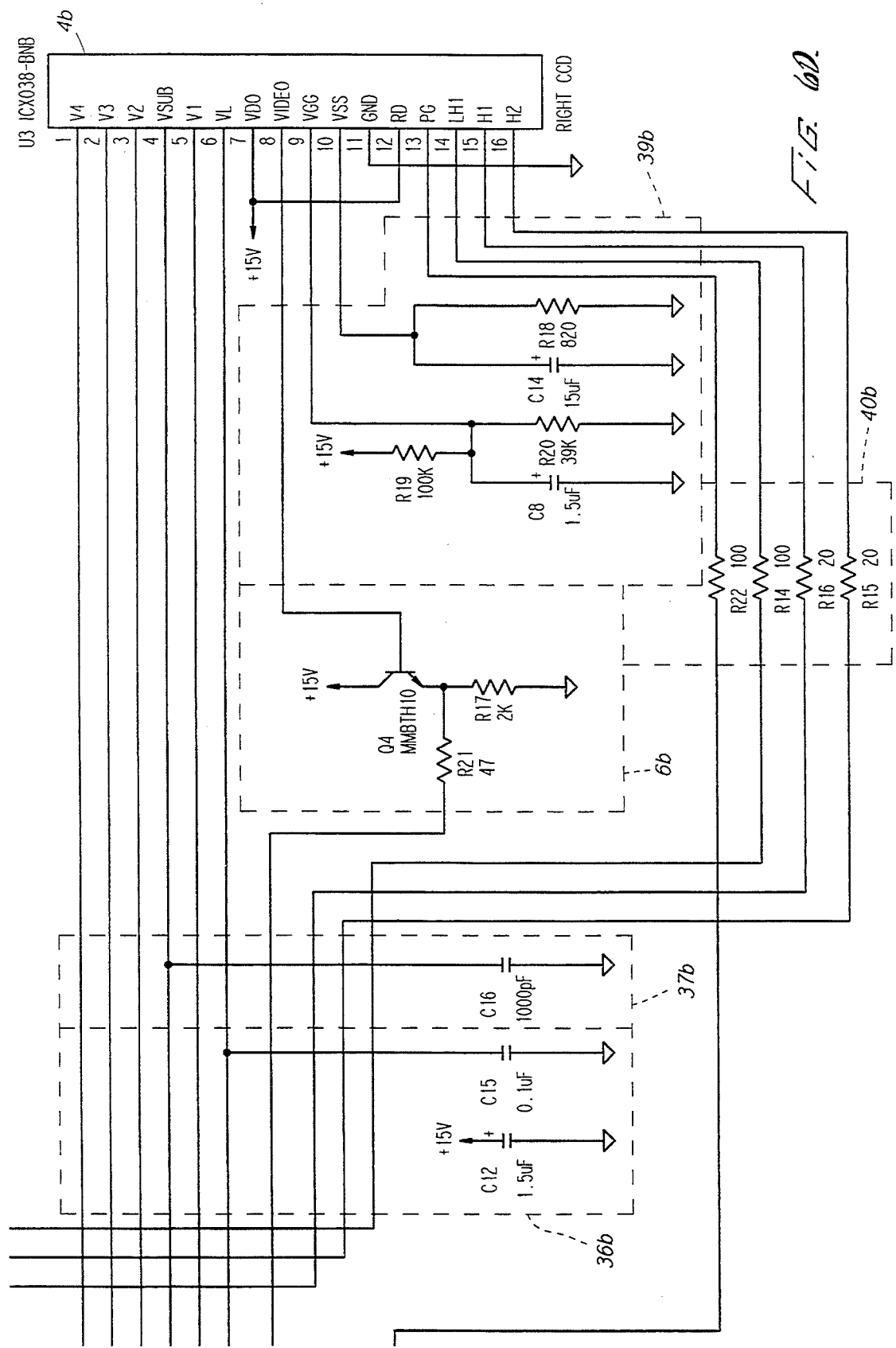

A detailed schematic of an embodiment of the camera head of the subject invention is illustrated in FIG. 6. As shown at the far right, two imagers, 4a and 4b are provided. In this implementation, they are Sony ICX038 CCD's. At the far left is connector 30 for connecting cable 3 to the camera head.

The V timing signal in this implementation comprises four (4) signals, V1–V4, found on pins 2–4, and 6, and the H timing signal in this implementation is H1, found on pin 10. The pre-video left and pre-video right signals from the two CCD's are found on pins 1 and 8. The other signals, VSUB, VL, PGinv, and VSUB(+20), found on pins 5, 7, 9, 11, are part of a standard interface to a CCD, and are known to those of ordinary skill in the art.

The circuitry identified with numeral 31 functions to add a DC level to the VSUB and VSUB(+20) signals, and the resulting output signals therefrom, VSUB LEFT and VSUB RIGHT, are passed as shown to the two CCD's.

The circuitry identified with numeral 32 includes an advanced CMOS 74AC74 D-type flip-flop, and functions as a current driver. This circuitry takes PGinv as an input, amplifies and inverts the same, and passes the resulting output signal to the circuitry identified with numeral 33, which adds a DC level to the signal. The resulting output signals, PG LEFT and PG RIGHT, are respectively passed to the two CCD's.

The circuitry identified with numeral 34 functions as a current driver and a phase invertor. That circuitry takes H1 as an input, and splits the same into H1 and H2

(which are inverses of each other) and passes the same to both CCD's.

The circuitry identified with numeral 35 takes the H2 signal (which swings from 0 to 5 V) and inverts and changes the same so that the output signal, LH1, swings from −5 V to 5 V. This signal is then passed to the two CCD's.

The circuitry identified with numerals 36a and 36b acts as a power supply filter for the VL(−9) signal before the same is input to the CCD's. The circuitry identified with numerals 37a and 37b functions as signal conditioning circuitry for the VSUB LEFT and VSUB RIGHT signals before the same are input to the CCD's.

The circuitry identified with numerals 6a and 6b are common emitter buffers, which function as current amplifiers for the pre-video left and pre-video right signals supplied by the CCD's.

The resistors identified with numerals 40a and 40b function to damp out ringing in the PG, LH1, H1, and H2 signals before the same are input to the CCD's.

The circuitry identified with numerals 39a and 39b function to establish bias points for the VGG and VSS inputs to the CCD's.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A video camera system, comprising:
   circuitry including at least one timing driver for generating at least one driving signal; and
   a camera head including a first imager coupled to said at least one timing driver for generating a first pre-video signal responsive to said at least one driving signal and a second imager coupled to said at least one timing driver for generating a second pre-video signal responsive to said at least one driving signal;
   wherein said at least one driving signal drives said first and second imagers in synchronicity;
   wherein said at least one timing driver is located in proximity to said first and second imagers to avoid degradation of the at least one driving signal therebetween; and
   wherein at least a portion of said circuitry is spaced from said camera head, and said circuitry and imagers are configured so that said first and second pre-video signals are substantially synchronous with each other.

2. The camera system of claim 1 wherein said first and second imagers are enclosed within a single enclosure.

3. The camera system of claim 1 further comprising a cable, wherein said first and second pre-video signals are passed to said portion of said circuitry by means of said cable.

4. The camera system of claim 1 further comprising an endoscope wherein said camera head is mounted on said endoscope.

5. The system of claim 1 wherein said first and second imagers are CCD's.

6. The system of claim 1 wherein said at least one timing driver is contained within the camera head.

7. The system of claim 1 wherein said circuitry further comprises a timing generator spaced from said camera head and coupled to and controlling first and second timing drivers situated in said camera head by means of at least one timing signal, the first timing driver coupled to said first imager and generating at least one first driving signal, responsive to the at least one timing signal, for controlling the same, and the second timing driver coupled to said second imager and generating at least one second driving signal, responsive to the at least one timing signal, for controlling the same, wherein said first and second pre-video signals are substantially synchronous with said at least one timing signal.

8. The system of claim 7 wherein said at least one timing signal is passed to said camera head and said pre-video signals are passed to said portion of said circuitry spaced from said camera head through signal lines contained in a single cable.

9. The system of claim 1 further comprising:
   first and second amplifiers situated in said camera head, wherein said first amplifier is coupled to said first imager for generating an amplified first pre-video output signal responsive to said first pre-video output signal, and said second current amplifier is coupled to said second imager for generating an amplified second pre-video output signal responsive to said second pre-video output signal.

10. The system of claim 9 further comprising first and second sample-and-hold circuits spaced from said camera head, wherein said first sample-and-hold circuit is coupled to said first amplifier for receiving said first amplified pre-video output signal, and said second sample-and-hold circuit is coupled to said second amplifier for receiving said second amplified pre-video output signal.

11. A video camera system, comprising:
    circuitry including a timing generator for providing at least one timing signal;
    said circuitry also including at least one timing driver coupled to said timing generator for generating at least one driving signal responsive to said at least one timing signal; and
    a camera head including a first CCD coupled to said at least one timing driver for generating a first pre-video signal responsive to said at least one driving signal, and a second CCD coupled to said at least one timing driver for generating a second pre-video output signal responsive to said at least one driving signal;
    wherein a first portion of said circuitry containing said timing generator is spaced from said camera head; and
    wherein a second portion of said circuitry containing said at least one timing driver is contained in said camera head, the at least one timing driver being located in proximity to the first and second CCDs to avoid degradation of the at least one driving signal therebetween, and said timing generator and said at least one timing driver are configured such that said at least one timing signal and said pre-video signals are substantially synchronous with each other.

12. The system of claim 11 further comprising:
    a cable; and
    at least one amplifier situated in said camera head and coupled to said CCDs for generating first and second amplified pre-video signals responsive to said first and second pre-video signals;
    wherein said at least one timing signal is passed between said first and second portions of said circuitry, and said first and second amplified pre-video signals are passed between said at least one amplifier and said first portion of said circuitry, through signal lines contained in said cable.

13. A method for generating first and second pre-video output signals in a remote endoscopic video camera, comprising:

providing at least one timing signal;

providing at least one first timing driver for generating at least one first driving signal responsive to said at least one timing signal;

providing at least one second timing driver for generating at least one second driving signal responsive to said at least one timing signal;

providing at least one first imager for generating a first pre-video output signal responsive to said at least one first driving signal which is substantially synchronous with said at least one timing signal, said at least one first imager being located in proximity to said at least one first timing driver to avoid degradation of said at least one first driving signal therebetween; and providing at least one second imager for generating a second pre-video output signal responsive to said at least one second driving signal which is substantially synchronous with said at least one timing signal and said first pre-video output signal, said at least one second imager being located in proximity to said at least one second timing driver to avoid degradation of said at least one second driving signal therebetween.

14. A method for generating first and second pre-video output signals in a remote endoscopic video camera, comprising:

generating at least one timing signal;

providing at least one timing driver for generating at least one driving signal responsive to said at least one timing signal;

providing a first imager for generating a first pre-video output signal responsive to said at least one driving signal and substantially synchronous with said at least one timing signal, said first imager being located in proximity to said at least one timing driver to avoid degradation of said at least one driving signal therebetween; and providing a second imager for generating a second pre-video output signal responsive to said at least one driving signal which is substantially synchronous with said at least one timing signal and said first pre-video output signal, said second imager being located in proximity to said at least one timing driver to avoid degradation of said at least on driving signal therebetween.

15. A method for generating first and second pre-video output signals in a remote endoscopic video camera, comprising:

providing at least one timing driver for generating at least one driving signal;

providing a first imager for generating a first pre-video output signal responsive to said at least one driving signal, said first imager being located in proximity to said at least one timing driver to avoid degradation of said at least one driving signal therebetween; and providing a second imager for generating a second pre-video output signal responsive to said at least one driving signal and substantially synchronous with said first pre-video output signal, said second imager being located in proximity to said at least one timing driver to avoid degradation of said at least one driving signal therebetween.

16. The method of claim 15 further comprising:

generating said first and second pre-video output signals from said at least one driving signal.

17. The method of claim 16 further comprising:

generating at least one timing signal;

generating said at least one driving signal from said at least one timing signal; and generating said first and second pre-video output signals to be substantially synchronous with said at least one timing signal.

18. The method of claim 15 further comprising: generating said first and second pre-video output signals respectively from first and second driving signals.

19. The method of claim 18 further comprising:

generating at least one timing signal;

generating said first driving signal from said at least one timing signal;

generating said second driving signal from said at least one timing signal; and generating said first and second pre-video output signals to be substantially synchronous with said at least one timing signal.

20. A video camera system, comprising:

circuitry including at least one generator for generating at least one control signal; and a camera head including a first imager coupled to the circuitry for generating a first pre-video signal responsive to said at least one control signal and a second imager coupled to the circuitry for generating a second pre-video signal responsive to said at least one control signal, the first and second imagers being located in proximity to a first portion of the circuitry to avoid degradation of the at least one control signal therebetween;

wherein said at least one control signal controls said first and second imagers in synchronicity; and wherein at least a second portion of said circuitry is spaced from said camera head, and said circuitry and said imagers are configured so that said first and second pre-video signals are substantially synchronous with each other.

21. The system of claim 20 wherein said at least one generator is spaced from said camera head.

22. The system of claim 20 wherein said at least one generator is situated at said camera head.

23. The system of claim 20 wherein said at least one generator comprises at least one timing generator for generating said at least one control signal which is at least one timing signal.

24. The system of claim 20 wherein said at least one generator comprises at least one timing driver for generating said at least one control signal which is at least one driving signal.

25. The system of claim 20 wherein said circuitry and said imagers are configured so that said at least one control signal is substantially synchronous with said first and second pre-video signals.

* * * * *